United States Patent [19]
Dybwad

[11] Patent Number: 4,787,745
[45] Date of Patent: Nov. 29, 1988

[54] CONJUGATE INTERFEROMETER

[75] Inventor: Jens P. Dybwad, Acton, Mass.

[73] Assignee: The Perkin-Elmer Corporation, Norwalk, Conn.

[21] Appl. No.: 525,914

[22] Filed: Aug. 24, 1983

[51] Int. Cl.[4] .................... G01B 9/02; G01J 3/12
[52] U.S. Cl. ........................................... 356/346
[58] Field of Search .............. 356/345, 346, , 347, 356/348, 349, 352, 353, 354, 355, 356, 357, 358, 359, 360, 361, 362, 363, 445, 346; 350/1.6, 1.7, 163, 165

[56] References Cited

U.S. PATENT DOCUMENTS

| | | | |
|---|---|---|---|
| 3,499,716 | 3/1970 | Bennett | 356/445 |
| 3,549,260 | 12/1970 | Barringer | 356/346 |
| 3,977,786 | 8/1976 | Gast | 356/346 |
| 4,225,236 | 9/1980 | Sandercock | 356/346 |
| 4,280,764 | 7/1981 | Sica et al. | 356/345 X |
| 4,319,843 | 3/1982 | Gornall | 356/346 |
| 4,449,823 | 5/1984 | Schwiesow | 356/346 |

FOREIGN PATENT DOCUMENTS 1035554 8/1983 U.S.S.R. ......................... 350/1.6

OTHER PUBLICATIONS

Danielewicz et al, "Hybrid Metal Mesh-Dielectric Mirrors for Optically Pumped Far Infrared Lasers", Applied Optics, vol. 15, No. 3, pp. 761–767, Mar. 1976.

Primary Examiner—Vincent P. McGraw
Attorney, Agent, or Firm—Thomas P. Murphy; Edwin T. Grimes; Francis L. Masselle

[57] ABSTRACT

A conjugate interferometer includes a first interferometer and a second interferometer arranged so that the common optical element thereof is the respective translating mirrors of the first and second interferometers.

8 Claims, 3 Drawing Sheets

4,787,745

CONJUGATE INTERFEROMETER

BACKGROUND OF THE INVENTION

The present invention generally relates to an interferometric optical system and, in particular, relates to a conjugate interferometer the common optical element of which is a moving mirror.

In general, an interferometer is any arrangement whereby a beam of light is separated into two or more parts by partial reflections, the parts being subsequently reunited after traversing different optical paths. The reunited parts produce interference. Interferometers are used, inter alia, for the precise measurement of wavelengths and for the measurements of very small distances and thicknesses by using known wavelengths.

In recent years interferometers have been increasingly used in the field of infrared spectrophotometry and, in particular, in instruments generally referred to as Fourier Transform Infrared (FT/IR) spectrophotometers. By the use of an interferometer, rather than the more conventional dispersive optical system, an infrared analysis can be performed faster, with greater light energy throughput and with a reduction in errors caused by stray light. These advantages are well known in the analytical instrument field.

However, in conventional FT/IR instruments there is one disadvantage, particularly in comparison to dispersive instruments. The disadvantage is that an interferometer has a reduced, i.e. narrower, range of operating wavelengths. In dispersive instruments the range of operating wavelengths is comparatively broad primarily because of the use therein of easily interchanged diffraction gratings which disperse incoming light according to wavelength. These diffraction gratings are generally made to rotate and thus direct a particular narrower, or dispersed, band of wavelengths of interest towards the sample. The range of wavelengths over which an interferometer functions is determined by the beamsplitter thereof. As it happens, the presently available beamsplitters, although as a group provide a broad range of operating wavelengths, individually provide a comparatively narrower range of operating wavelengths.

One solution to the difficulties caused by this transmission characteristic of beamsplitters is to fabricate an optical interferometer wherein the beamsplitter is removable. In such an interferometer various beamsplitters could be interchanged to provide a relatively broad range of operating wavelengths. However, to obtain highly accurate results the mechanical tolerances on the beamsplitters and the associated fixtures would be difficult and expensive to maintain. This would become more difficult in the long term due to the natural wearing of interfacing mechanical parts. This inherently results in optical alignment difficulties.

A further difficulty results from the fact that the optical compartment of an FT/IR spectrophotometer is usually maintained in a controlled environment. Consequently, each time a beamsplitter is exchanged the compartment is subject to contamination as well as necessitating the reestablishment of the controlled environment. This is inefficient and time consuming.

SUMMARY OF THE INVENTION

Accordingly, it is one object of the present invention to provide an interferometric optical system having an increased range of operating wavelengths.

This object is accomplished, at least in part, by a conjugate interferometer the common optical element of which is a moving mirror.

Other objects and advantages will become apparent to those skilled in the art from the following detailed description read in conjunction with the appended claims and the drawing attached hereto.

BRIEF DESCRIPTION OF THE DRAWING

The drawing, which is not drawn to scale, includes.

DETAILED DESCRIPTION OF THE INVENTION

Figure 1:
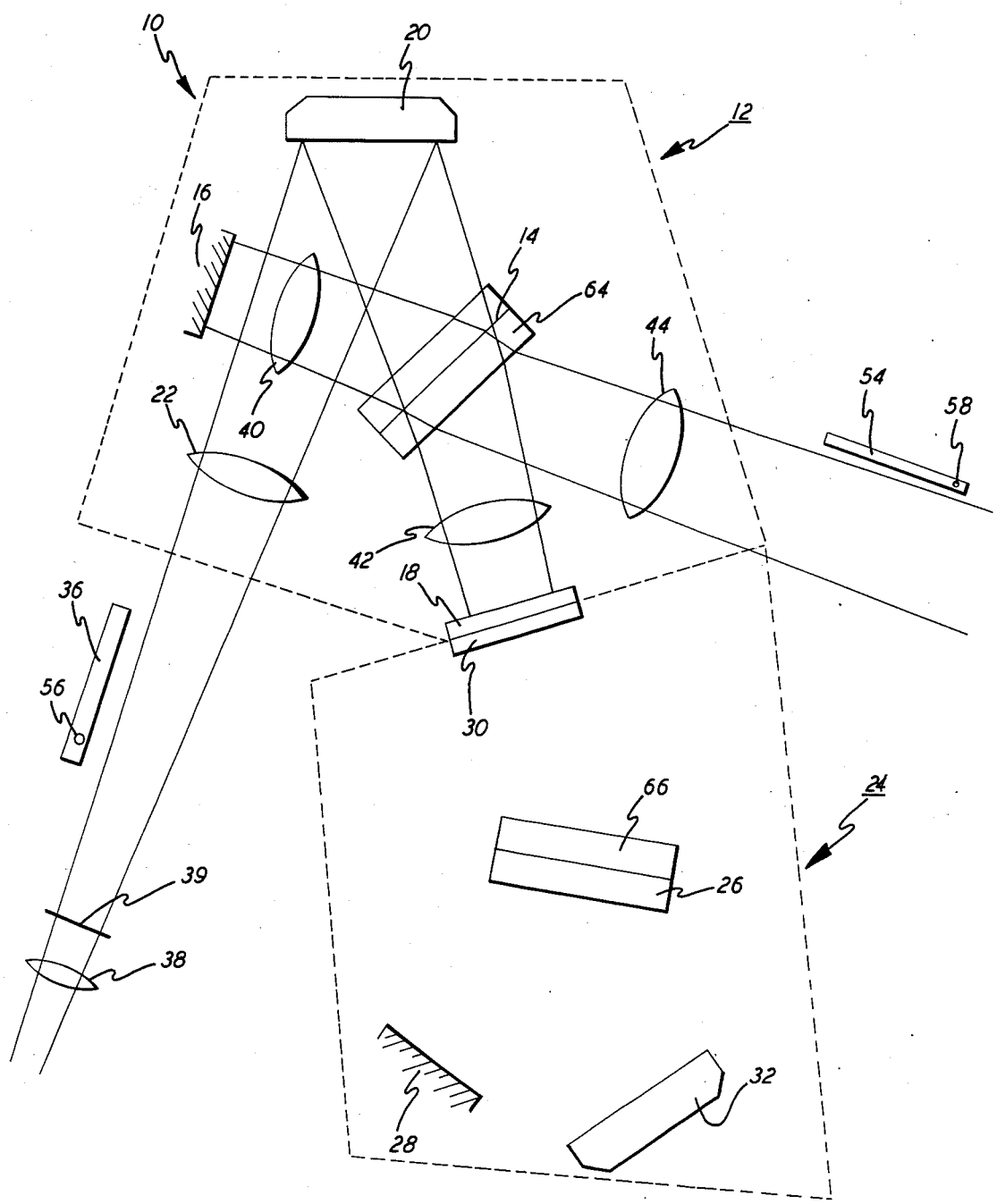
FIG. 1 which is an optical schematic of a conjugate interferometer embodying the principles of the present invention and depicting a first optical path.

A conjugate interferometer, generally indicated at 10 in the drawing and embodying the principles of the present invention, includes a first interferometer 12 having a first beamsplitter 14, a first fixed mirror 16 and a first translatable mirror 18. The first interferometer 12 also includes a means 20 for directing an incident light beam 22 toward the first beamsplitter 14. The conjugate interferometer 10 also includes a second interferometer 24 having a second beamsplitter 26, a second fixed mirror 28 and a second translatable mirror 30 which second translatable mirror 30 is affixed to the first translatable mirror 18. The second interferometer 24 also includes a means 32 for directing an incident beam 34 towards the second beamsplitter 26. The conjugate interferometer 10 further includes a means 36 for selectively directing a source beam 38 of light toward either the means 20 of the first interferometer 12 or the means 32 of the second interferometer 34.

Referring specifically to FIG. 1, it will be seen that a source incident beam 38 is directed toward the means 20 of the first interferometer 12. The source incident beam 38 is apertured by a conventional Jacquinot stop 39. The means 20 for directing the incident light beam 22 toward the first beamsplitter 14 is, in the preferred embodiment, a paraboloid mirror. The first beamsplitter 14 has a operating wavelength range of, for example, between 5000 wavenumbers and 450 wavenumbers. That is, the transmission/reflection characteristics are such that the interferometric reflection and transmission beams are undistorted so long as they are within the operating range. As in conventional interferometric optics, a partially reflected beam 40 is directed toward the fixed mirror 16 which reflects that beam 40 back to the first beamsplitter 14. The partially transmitted beam 42 is directed toward the first translatable mirror 18 which reflects that light beam 42 back to the first beamsplitter 14 where it is reunited with the reflected beam 40 to form an exit 44 or interference beam.

Figure 3:
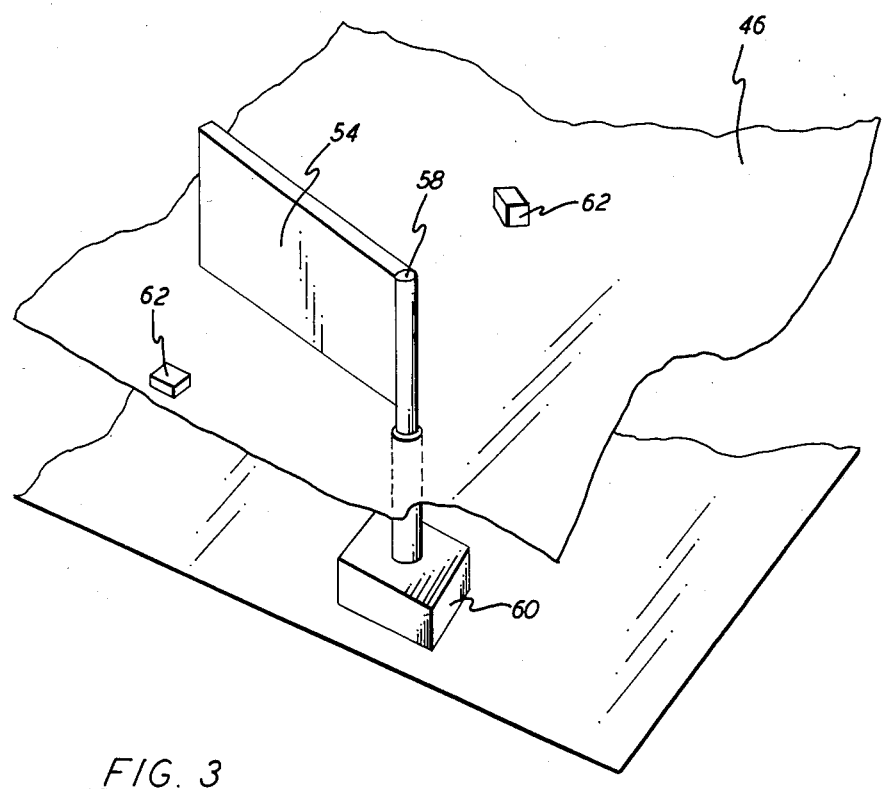
FIG. 3 which is a side view of an exemplary beam directing mechanism for use in the conjugate interferometer shown in FIGS. 1 and 2.

In the first interferometer 12, the means 20, i.e. the paraboloid mirror, the fixed mirror 16 and the first beamsplitter 14 are rigidly mounted on an optical bench 46, shown in FIG. 3, and therefore always remain in optical alignment with respect to the other elements of the conjugate interferometer 10.

Figure 2:
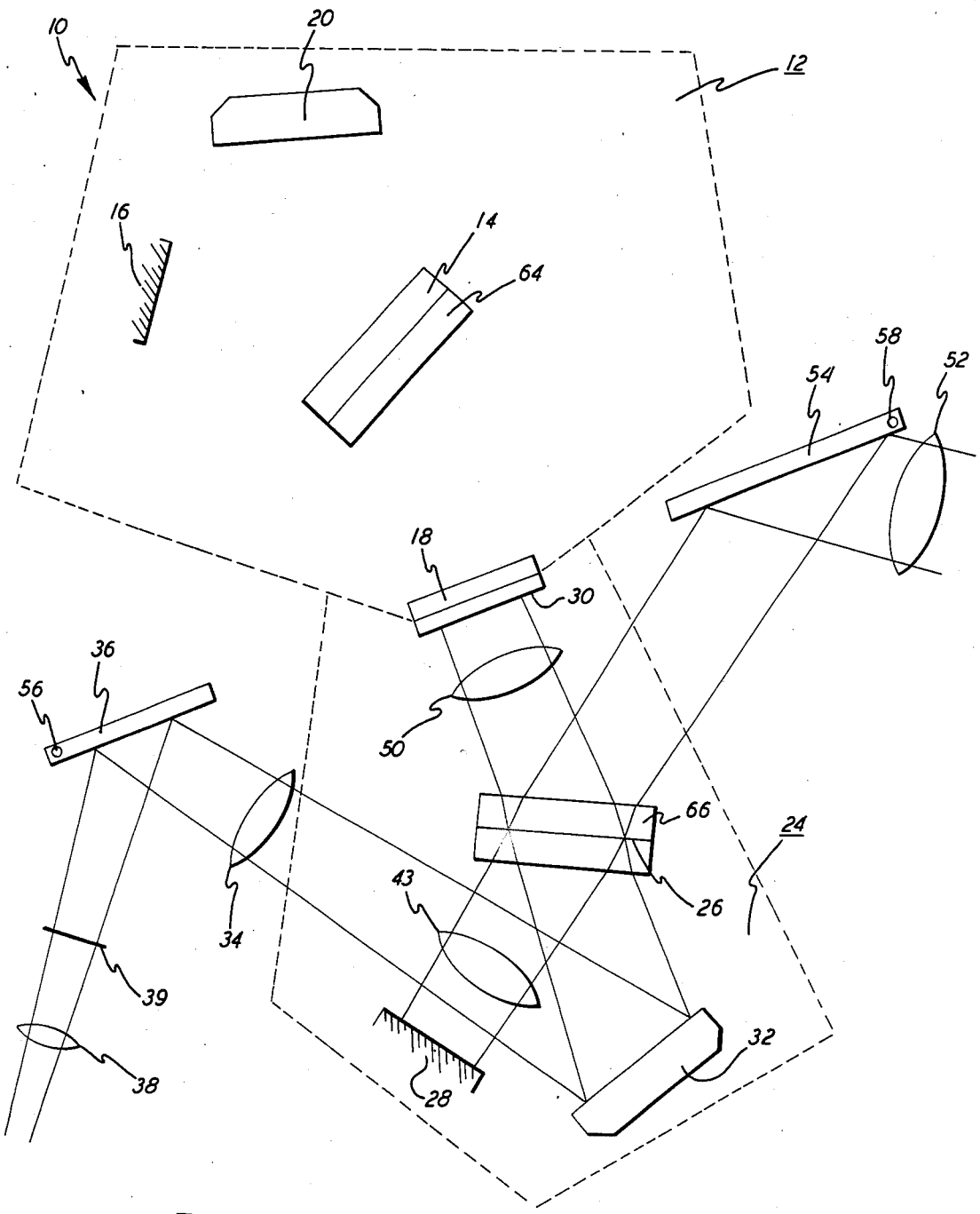
FIG. 2 which is an optical schematic of the conjugate interferometer shown in FIG. 1 but depicting a second optical path.

Referring specifically now to FIG. 2, it will be observed that the source incident beam 38, after passing through Jacquinot stop 39 impinges on the means 36 which is a beam directing plate. The beam directing plate 36 directs the source beam 38 to the second means 32 for directing the incident light beam toward the second beamsplitter 26. As shown, the second beamsplitter 26 divides the beam into a partially reflected beam 43 which is then reflected via the fixed mirror 28 and a partially transmitted beam 50. The partially transmitted beam 50 is directed to the second translatable mirror 30 and reflected back to the second beamsplitter 26 where it reunites with the returned reflected beam 48 to form an exit beam 52. The exit beam 52, as shown in FIG. 2, is directed along the same optical path as the first exit beam 44 from the first beamsplitter 14 by means of a second beam directing element 54.

In one embodiment, the second beamsplitter 26 has a wavelength operating range from, for example, between 500 wavenumber and 50 wavenumber, although other operating ranges can also be provided by the proper selection of the beamsplitter composition.

The first and second directing elements, 36 and 54 respectively, are either scatter gratings, which disperse the short wavelengths of the source beam 38, or mirrors which reflect the entire source beam 38. If the operating wavelength of the second beamsplitter 26 is relatively longer such as, for example, 500 wavenumber to 50 wavenumber, the deflecting elements 36 and 54 are preferably scatter gratings which disperse the source light beam 38 to ensure that the desired longer wavelength segment contained therein is directed to the second beamsplitter 26. As shown, the first and second directing means, 36 and 54 respectively, each rotate about respective axes, 56 and 58 respectively. In one embodiment, a portion of which is shown in FIG. 3, the directing means, 36 and 54, are operated via a motor means 60 which can be a stepper motor. Preferably, the motor means 60 includes a slip clutch associated therewith, not shown in FIG. 3, whereby the beam directing means, 36 and 54, are rotated between a first position and a second position and retained at each position via mechanical stops 62.

In the second interferometer 24, the means 32, i.e., the paraboloid mirror, and the fixed mirror 28 are rigidly affixed to the optical bench 46 and therefore always remain in fixed positional relation with the other optical elements of the conjugate interferometer 10.

The first translatable mirror 18 of the first interferometer 12 and the second translatable mirror 30 of the second interferometer 24 are preferably affixed to each other in a back-to-back relationship. Thus, the only portion of the conjugate interferometer 10 which moves is the translatable mirrors, 18 and 30, of each of the first and second interferometers, 12 and 24 respectively. In this fashion, extraordinary alignment is achieved while prohibitive tolerance requirements are avoided since the translatable mirrors, 18 and 30, of each interferometer, 12 and 24 respectively, are driven by a single motive means, not shown in the drawing. Furthermore, by so arranging the first and second translatable mirrors, 18 and 30 respectively, multiple moving parts are avoided. As a consequence, all critical optical elements of the conjugate interferometer 10 remain fixed and consequently aligned with each other as would be the case in a single conventional interferometer. By avoiding such excess moving parts the alignment difficulties normally associated with extending the operating wavelength of an interferometer are avoided.

In the preferred embodiment, the incident beam directing means, 20 and 32, are parabolic mirrors having a focal length equal to 222.84 cm and the optical gratings of the directing means, 36 and 54, are ruled at 40 lines per millimeter. As above stated, the first beamsplitter 14 is preferably formed by vacuum depositing a layer of germanium on a potassium bromide crystal substrate. Additionally, the potassium bromide beamsplitter has associated therewith a pathlength compensation plate 64 which equalizes the optical path traveled by the partially transmitted beam and the partially reflected beam. The second beamsplitter 26 is, in the preferred embodiment, formed, for example, from polyethylene terephalate to provide an optical wavelength operating range of between 500 wavenumber and 50 wavenumber. As shown, a second compensator plate 66 is associated therewith. Hence, the overall wavelength range of the conjugate interferometer 10 is from about 5000 wavenumbers to about 50 wavenumbers.

Advantageously, by ensuring that all optical elements in the relevant interferometers, i.e., the beamsplitter and the fixed mirrors, are rigidly affixed to a common optical bench most optical alignment difficulties are minimized. Further, there is no need to break the controlled ambient to switch from the first interferometer 12 to the second interferometer 24 during operation.

It will be understood that the overall operating wavelength can be further extended by providing a second conjugate interferometer, not shown in the drawing, having beamsplitters of different operating wavelength ranges. The second conjugate interferometer could either be rigidly affixed above or below the second conjugate interferometer 10. The source incident beam 38 could then be directed to the appropriate conjugate interferometer by a pair of rotatable mirrors. Such an arrangement could be easily incorporated without requiring excessive or prohibitively expensive mechanical and optical tolerances.

Although the present invention herein has been described with respect to a specific embodiment it will be understood that other arrangements and configurations are available and without departing from the spirit and scope of the present invention. Consequently, the present invention is deemed limited only by the appended claims and the reasonable interpretation thereof.

What is claimed is:

1. A conjugate interferometer comprising:
a source beam of light;
a first interferometer having a first beamsplitter, first means to direct the source beam of light to said first beamsplitter, a first translatable mirror in spaced angular relation to said first beamsplitter defining a first optical path, a first fixed mirror in spaced angular relation to said first beamsplitter defining a second optical path;
a second interferometer having a second beamsplitter, second means to direct the source beam of light to said second beamsplitter, a second translatable mirror in spaced angular relation to said second beamsplitter defining a third optical path, a second fixed mirror in spaced angular relation to said second beamsplitter defining a fourth optical path, said second translatable mirror being in back-to-back relation to said first translatable mirror;

directing means for directing the source beam of light to either said first or said second interferometer.

2. Conjugate interferometer as claimed in claim 1 wherein said first and second translatable mirrors are formed on opposite surfaces of a unitary substrate.

3. Conjugate interferometer as claimed in claim 1 wherein said first beamsplitter has a first range of operating wavelengths and said second beamsplitter has a second range of operating wavelengths said first range and said second range being different.

4. Conjugate interferometer as claimed in claim 3 wherein said first beamsplitter is a layer of germanium on a surface of an optically transparent substrate; and
said second beamsplitter is a film of polyethylene terephylate.

5. Conjugate interferometer as claimed in claim 3 having a range of operating wavelengths of about 5000 wavenumbers to about 50 wavenumbers.

6. Conjugate interferometer as claimed in claim 1 wherein said source incident beam directing means is a mirror, said mirror being rotatable between a first position whereat said source incident beam is unaffected thereby and a second position whereat said mirror is in the path of said source incident beam.

7. Conjugate interferometer as claimed in claim 1 wherein said source incident beam directing means is a scatter grating, said scatter grating being rotatable between a first position whereat said source incident beam is unaffected thereby and a second position whereat said scatter grating is in the path of said source incident beam.

8. Conjugate interferometer as claimed in claim 1; further comprising:
means for directing the exit beam of said second interferometer along the same path as the exit beam of said first interferometer.

* * * * *